US012495476B2

(12) United States Patent
Hoffmann (10) Patent No.: US 12,495,476 B2
(45) Date of Patent: Dec. 9, 2025

(54) MOTION TRACKING LIGHT CONTROLLER

(71) Applicant: Christopher J. Hoffmann, Fayetteville, AR (US)

(72) Inventor: Christopher J. Hoffmann, Fayetteville, AR (US)

(*) Notice: Subject to any disclaimer, the term of this patent is extended or adjusted under 35 U.S.C. 154(b) by 212 days.

(21) Appl. No.: 18/453,188

(22) Filed: Aug. 21, 2023

(65) Prior Publication Data

US 2024/0074019 A1 Feb. 29, 2024

Related U.S. Application Data

(63) Continuation of application No. PCT/US2022/017338, filed on Feb. 22, 2022.

(60) Provisional application No. 63/178,993, filed on Apr. 23, 2021, provisional application No. 63/151,948, filed on Feb. 22, 2021.

(51) Int. Cl.
*H05B 47/115* (2020.01)
*G06F 3/0346* (2013.01)
*H05B 45/10* (2020.01)
*H05B 45/20* (2020.01)

(52) U.S. Cl.
CPC ........ *H05B 47/115* (2020.01); *G06F 3/0346* (2013.01); *H05B 45/10* (2020.01); *H05B 45/20* (2020.01)

(58) Field of Classification Search
CPC ...... H05B 47/115; H05B 45/20; H05B 45/10; G06F 3/0346
USPC ............................................. 345/158
See application file for complete search history.

(56) References Cited

U.S. PATENT DOCUMENTS

| | | | |
|---|---|---|---|
| 2012/0280638 A1* | 11/2012 | Pereira | H05B 45/357 315/297 |
| 2012/0330387 A1* | 12/2012 | Ferraz Rigo | H05B 47/115 250/206 |
| 2023/0384860 A1* | 11/2023 | Dedonato | A63F 13/65 |

* cited by examiner

*Primary Examiner* — Calvin C Ma
(74) *Attorney, Agent, or Firm* — Kolitch Romano Dascenzo Gates LLC (57) ABSTRACT

A wearable or portable device may include a motion-based lighting control system. A motion sensor (e.g., an accelerometer and/or gyroscope) is configured to sense movement or orientation of the wearable or portable device when worn or carried. A plurality of light sources are disposed on the wearable device. Processing logic of the device is configured to receive information from the motion sensor and to control the plurality of LED lamps based on the received information.

17 Claims, 9 Drawing Sheets

MOTION TRACKING LIGHT CONTROLLER

CROSS-REFERENCES

The following applications and materials are incorporated herein, in their entireties, for all purposes: U.S. Provisional Patent Application Ser. No. 63/151,948, filed Feb. 22, 2021; U.S. Provisional Patent Application Ser. No. 63/178,993 filed Apr. 23, 2021; and International Application PCT/US2022/017338, filed Feb. 22, 2022.

FIELD

This disclosure relates to systems and methods for controlling light sources coupled to wearable and costume articles.

INTRODUCTION

There are few options for costume designers who want to add lighting to animate their costume designs and performances. Most of these options involve blinking or sequencing light in a repetitive pattern. When a dancer is moving, there are limited ways to synchronize the light changes to the motions of the dancer. A few attempts have been made using remote controls or onboard programmed sequences triggered by body mounted switches, but all offer less than ideal results.

SUMMARY

The present disclosure provides systems, apparatuses, and methods relating to lighting controllers for wearable articles, such as wristbands and costume clothing.

In some examples, a wearable device includes a motion sensor configured to sense motion of the wearable device when worn; a plurality of light emitting diode (LED) lamps disposed on the wearable device; and processing logic configured to receive information from the motion sensor and to control the plurality of LED lamps based on the received information.

In some examples, a wearable device includes an accelerometer configured to sense an orientation of the wearable device when worn; a plurality of light emitting diode (LED) lamps disposed on the wearable device; and processing logic configured to receive orientation information from the accelerometer and to control the plurality of LED lamps based on the orientation information.

Features, functions, and advantages may be achieved independently in various embodiments of the present disclosure, or may be combined in yet other embodiments, further details of which can be seen with reference to the following description and drawings.

DETAILED DESCRIPTION

Various aspects and examples of a motion-tracking light control system suitable for use with wearable articles and costumes, as well as related methods, are described below and illustrated in the associated drawings. Unless otherwise specified, a motion-tracking light control system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. As used herein, the X-Y plane will define horizontal, with up being defined as the positive Z direction and down being defined as the negative Z direction. However, other dimensional associations may be utilized while retaining the same conceptual meaning.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

The present disclosure relates to a motion-tracking light control system having one or more solid-state movement sensors, including a gyroscope and/or an accelerometer. Programming logic is configured to use the orientation, the rate of rotation, the rate of change in rotation, the rate of acceleration, and/or the rate of change of acceleration to vary one or more outputs to affect the brightness and/or color of lighting. In some examples, this lighting is associated with a portable (e.g., carried) or wearable (e.g., worn) object, such as costumes and costume accessories, articles of footwear, hats, wearable and portable accessories, and/or jewelry. Examples of wearable objects include masks, wristwatch-like devices, bracelets and anklets, rings, etc. In some examples, light brightness and color control is utilized on a costume configured to be worn by a dancer or festival-goer. In some examples, motion-tracking light control systems of the present disclosure are utilized with pet-related accessories and wearables, such as leashes, collars, harnesses, and the like.

In general, the present disclosure offers an improvement over existing lighting technology by using motion of the user (e.g., a dancer) to drive one or more sensors. Processing logic is configured to convert the sensed motions or gestures into a change in voltage or current, which then changes the state and/or intensity of a corresponding light source, such as an LED bulb (or array of several bulbs) on a worn or carried object. Variations of LED bulbs include those that have red, green, and blue (RGB) LEDs in the same bulb (AKA lamp package), each activated by a unique power input. In some examples, single-color lamps are used, with bulbs that have a single light color, such as red or white. In RGB LED lamps, varying the voltage in different ratios to each of the three primary colors results in a myriad of controllable colors (typically over 16 million possible hues). Brightness levels of the different LEDs in the lamp are controlled using an RGB LED controller. If all color signals are turned up to the maximum brightness, a white light is created. In some examples, LED lamps such as RGBW (adding a white element) or RGBA (adding an amber element) may be used.

Aspects of motion-tracking light control systems described herein may be embodied as a computer method, computer system, or computer program product. Accordingly, aspects of the motion-tracking light control system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the motion-tracking light control system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with processing logic.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the motion-tracking light control system may be written in one or any combination of programming languages, including an object-oriented programming language (e.g., Java, C++), conventional procedural programming languages (e.g., C), and functional programming languages (e.g., Haskell). Mobile apps may be developed using any suitable language, including those previously mentioned, as well as Objective-C, Swift, C #, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the motion-tracking light control systems of the present disclosure may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the motion-tracking light control system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative wearable devices having motion-based lighting controllers, as well as related systems and/or methods. The examples in these sections are intended for illustration and should not be interpreted as limiting the scope of the present disclosure. Each section may include one or more distinct embodiments or examples, and/or contextual or related information, function, and/or structure.

Illustrative sensor configurations are described herein that share a novel approach to varying brightness and colors for wearable lighting. In a first example, a simple, single- or multi-axis accelerometer is tied to processing logic (e.g., a microprocessor or microcontroller) which feeds an amplifier (e.g., a metal-oxide-semiconductor field-effect transistor (MOSFET)). The amplifier varies an output voltage to a lamp or other light source. This selective variation uses acceleration and/or deceleration to translate motion and/or orientation information into light intensity and/or color.

In a second example, at least one axis of gyroscopic rotational sensing is added to the system (preferably a total of three axes). This added sensor capability facilitates accurate brightness control by sensing the rate of rotational change over time. In some examples, the rate of rotational change is translated such that 180 degrees of rotation per second would equal 100% full brightness, 90 degrees of change per second would be 50% brightness, with other rates translating into corresponding (e.g., interpolated or extrapolated) brightness values.

In embodiments containing a gyroscope and accelerometer together, the accelerometer sensor acts to augment the gyro reading (and/or vice versa). In some examples, if brightness is increasing as a result of an increasing revolutions per second (sensed by the gyro), and the rotation then stops abruptly (sensed by the accelerometer), the system may be configured to respond by adding a pop of bright light. In another example, a dancer wearing a costume of the present disclosure may wish to perform a sweeping, gentle move where the costume lights hit full brightness at the end of the move and then hold at that brightness, and the processing logic can be configured accordingly. The accelerometer data can be used to detect a quick deceleration, adding more brightness or holding the brightness for a few seconds. This combination of an accelerometer and gyroscope with customized processing logic can be used in a variety of novel ways. In some examples, accelerometer information is utilized to control lighting color based on orientation of the overall object (e.g., a wearable wristband or other device).

A. Illustrative Motion-Tracking Light Control Systems

Figure 1:
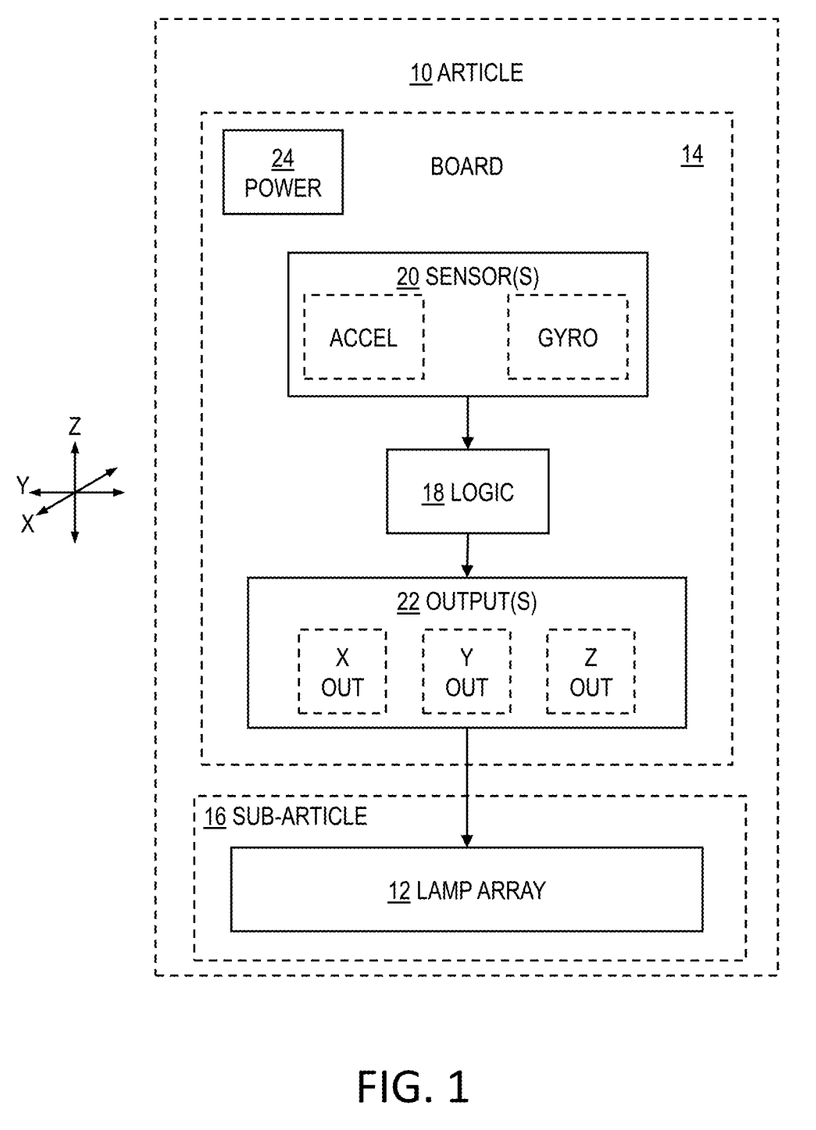
FIG. 1 is a schematic diagram of a portable or wearable article having a lighting array coupled to an illustrative onboard lighting controller of the present disclosure.

As shown in FIGS. 1-4, this section describes various motion-tracking light control systems, which are examples of the systems described above. FIG. 1 is a schematic diagram of an illustrative wearable or portable article 10 having a lighting array 12 controlled by a motion-tracking light control system 14. Article 10 may include any structure, object, or device having a lighting component and configured to be worn or carried by a user (e.g., a person or a pet). For example, article 10 may include a costume (e.g., dress, pants, or shirt), a hat or headdress, a wristband or ankle band, a wand or cane or walking stick, a shoe or boot, and/or the like.

Lighting array 12 may include one or more lamps or other light-emitting devices having controllable brightness and/or color. For example, lighting array 12 may include one or more light emitting diode (LED) lamps having controllable red, green, and blue (RGB) levels. Lighting array 12 may be configured to emit a general light, or may be arranged in one or more patterns, e.g., to spell a word, create different shapes or images, etc.

In some examples, lighting array 12 is disposed on, coupled to, or incorporated into a sub-article 16, also referred to as a portion or component of article 10. For example, lighting array 12 may be coupled to an optical tube that forms only a part of an overall head-mounted article.

Control system 14 includes processing logic 18, which receives input from a motion sensor suite 20 and provides one or more outputs 22 based on the sensor input. Processing logic 18 may include any suitable hardware and/or software configured to convert motion sensor inputs to corresponding lighting control outputs. For example, processing logic 18 may include a microcontroller, such as a PIC microcontroller, configured to control (via one or more MOSFETs or the like) load currents and/or voltages supplied to the lighting array. Other suitable chips, integrated circuits, and/or amplifiers may be utilized.

Motion sensor suite 20 may include any suitable sensor or sensors configured to convert sensed motion or orientation of article 10 (or sub-article 16) into an electrical signal. In some examples, motion sensor suite 20 includes one or more accelerometers, such as a multi-axis (e.g., three-axis) accelerometer configured to sense proper acceleration and orientation of the article and/or sub-article. In some examples, motion sensor array 20 includes a gyroscope configured to sense rotation and angular velocity. One or both types of sensors may be included, depending on the application.

Outputs 22 may include any suitable signals in the form of electrical voltages or currents configured to control a brightness and/or color of lighting array 12. For example, outputs 22 may include a first voltage corresponding to the X axis input from an accelerometer of motion sensor array 20, a second voltage corresponding to the Y axis input from the accelerometer, and a third voltage corresponding to the Z axis input from the accelerometer. These outputs may be coupled, respectively, to the red, green, and blue inputs of one or more RGB LED lamps in lighting array 12, such that a change in the orientation of the article will result in a corresponding change in the color of the LED lamp(s). Similarly, a magnitude of one or more of outputs 22 may be utilized to control a brightness level of one or more of the LED lamps in lighting array 12. Outputs 22 may be directly or linearly proportional to the signals from the accelerometer and/or gyroscope, or may be programmed to respond to the motion input(s) in a non-linear or other suitable manner, depending on the application.

System 14 further includes a power supply 24, which may include any suitable onboard power supply, such as a replaceable battery, a secondary battery, a supercapacitor, or the like. In some examples, power supply 24 comprises a rechargeable lithium-ion battery. By utilizing an onboard power supply, system 14 is self-contained, such that wearability is enhanced and the user is not constrained by being burdened by or tethered to an off-device source of power.

Figure 2:
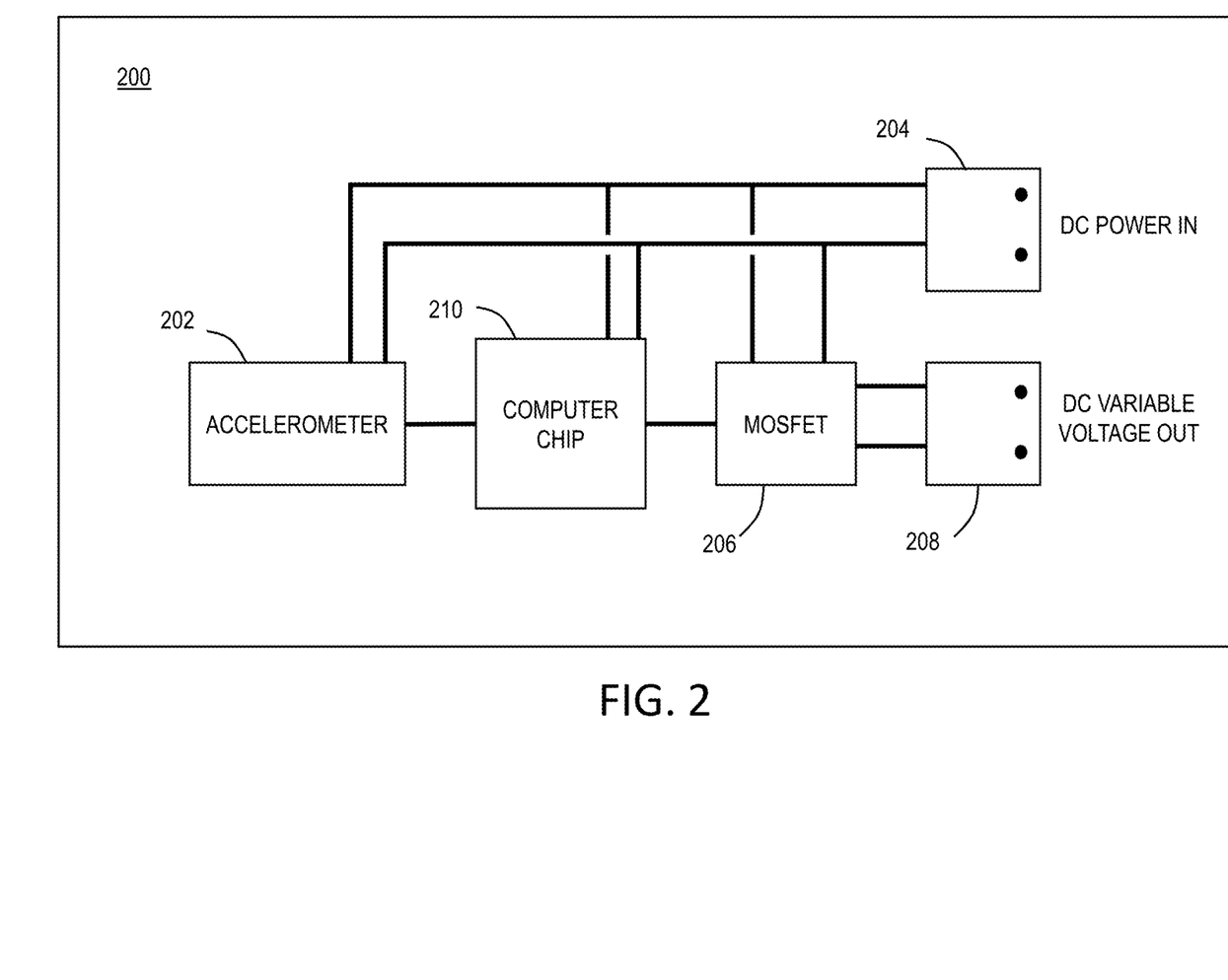
FIG. 2 is a schematic circuit diagram of an illustrative lighting controller of the present disclosure.

FIG. 2 depicts a first illustrative version of system 14, in the form of a system 200. System 200 includes a single motion sensor 202 (e.g., an accelerometer), with DC power 204 coming in at the upper right corner of the diagram (from a power supply not shown). This DC power supplies all of the devices of system 200, and offers load current to one or more MOSFETs 206. MOSFET(s) 206 are configured to vary the output voltage at variable DC voltage output terminal block 208, based on a control input from a microcontroller 210. Microcontroller 210 may receive movement-related information from sensor 202, and control MOSFETs 206 based on the movement information. Accordingly, system 200 may be useful to drive a brightness level of a lighting array coupled to block 208.

Figure 3:
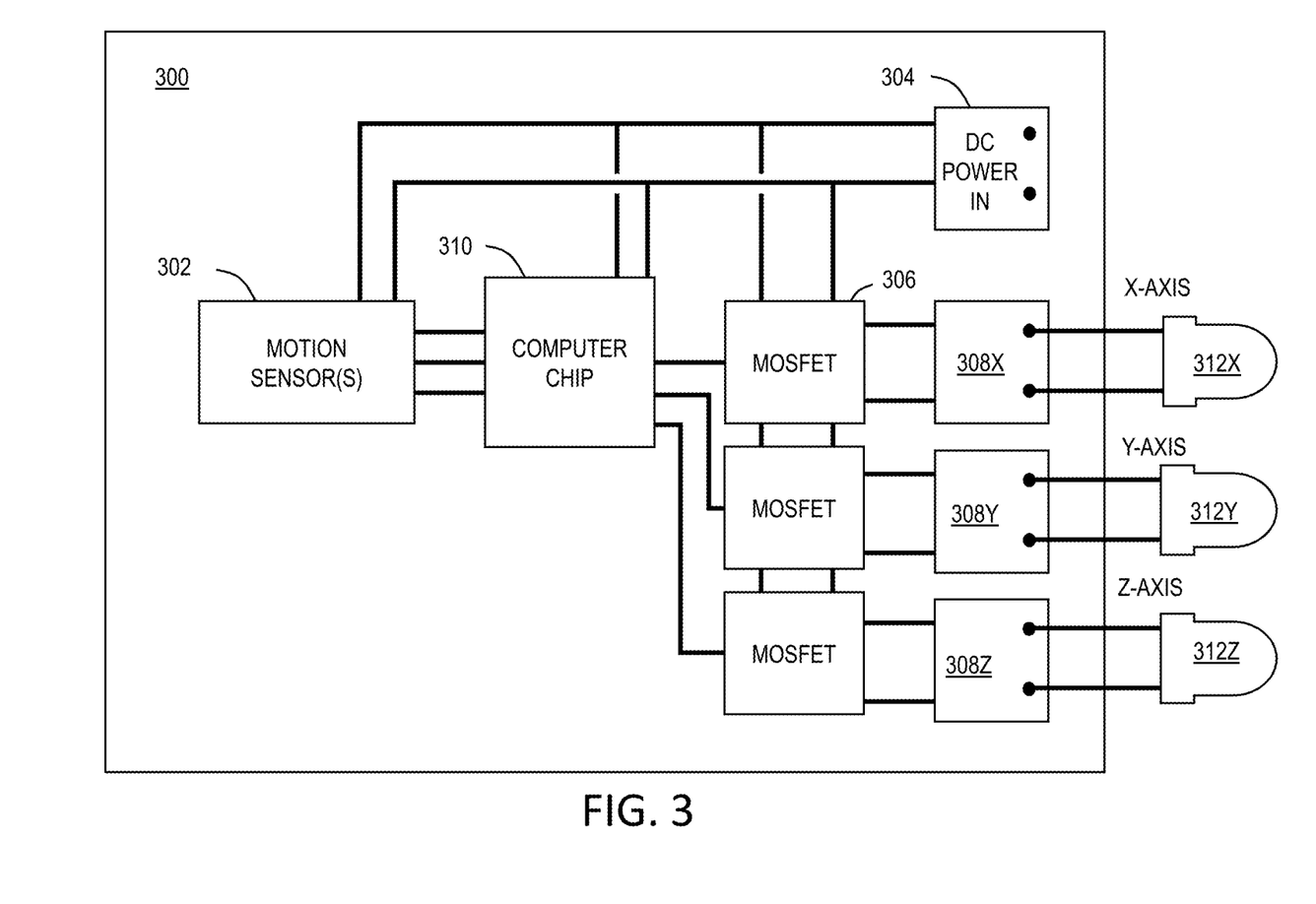
FIG. 3 is a schematic circuit diagram of another illustrative lighting controller of the present disclosure, coupled to a plurality of light emitting diodes (LEDs).

FIG. 3 depicts a second illustrative version of system 14, in the form of a system 300. System 300 in this example includes a sensor suite 302 having a three-axis accelerometer and a gyroscope. DC power 304 is depicted coming in at the upper right corner from a power supply (not shown). This DC power supplies all of the devices, and offers load current to three MOSFETs 306, which are configured to vary the output voltage to three corresponding DC output terminal blocks (308X, 308Y, and 308Z) based on a control input from the computer chip/microcontroller 310. This control input is varied based on information from the accelerometer and/or gyroscope. A respective LED lamp (312X, 312Y, 312Z) is coupled to each of the terminal output blocks, as shown in FIG. 3. Each of these lights acts in response to the gain of a corresponding axis of rotation or output. With three such axes outputs (X, Y, and Z), a different lighting gain construct can be implemented on each different axis of motion. Gain curves can be programmed to be linear, logarithmic, non-linear, or the like, or any combination thereof. When building a costume or other wearable device, light sources (e.g., LEDs) can be mounted to direct light in different directions, such as left, right, up, and down, to offer more variations in the user and viewer experience.

In some examples, a costume having a lighting control system in accordance with system 300 may be designed where green lights on the chest respond to motion in the X axis, and where red lights on the legs respond to motion in the Z axis. In some examples, a foot-mounted sensor and lighting array can trigger blasts of light in a downward direction, when foot stomping is detected based on rapid deceleration in the Z axis. This is much different, for example, than a sweeping and gentle light change for lights mounted to a pair of equipped costume wings.

When using only a gyroscope to change lighting gain, a stoppage in the rate of angular change would result in the voltage output gain going immediately to zero. This can be overcome (if a sustained light is desired) by adding one or more timers to create a sustained voltage or light brightness.

There are also times when a user may wish to make a move with a hard stop at the end, where the hard stop should offer a bright punch or flash of light. To provide this effect, the accelerometer's sensitivity to changes in velocity can be used to augment and vary the rate curve of the gain. These techniques offer more variety and stability in how the user can interact with the sensor.

The accelerometer or the gyroscope can be used to drive gain-hold and/or gain-fade. For example, as soon as a threshold is reached, instructions to hold for one second and then fast fade may be implemented. The two types of sensor systems can be used with or against each other in a variety of ways to create different dynamic lighting effects.

Figure 4:
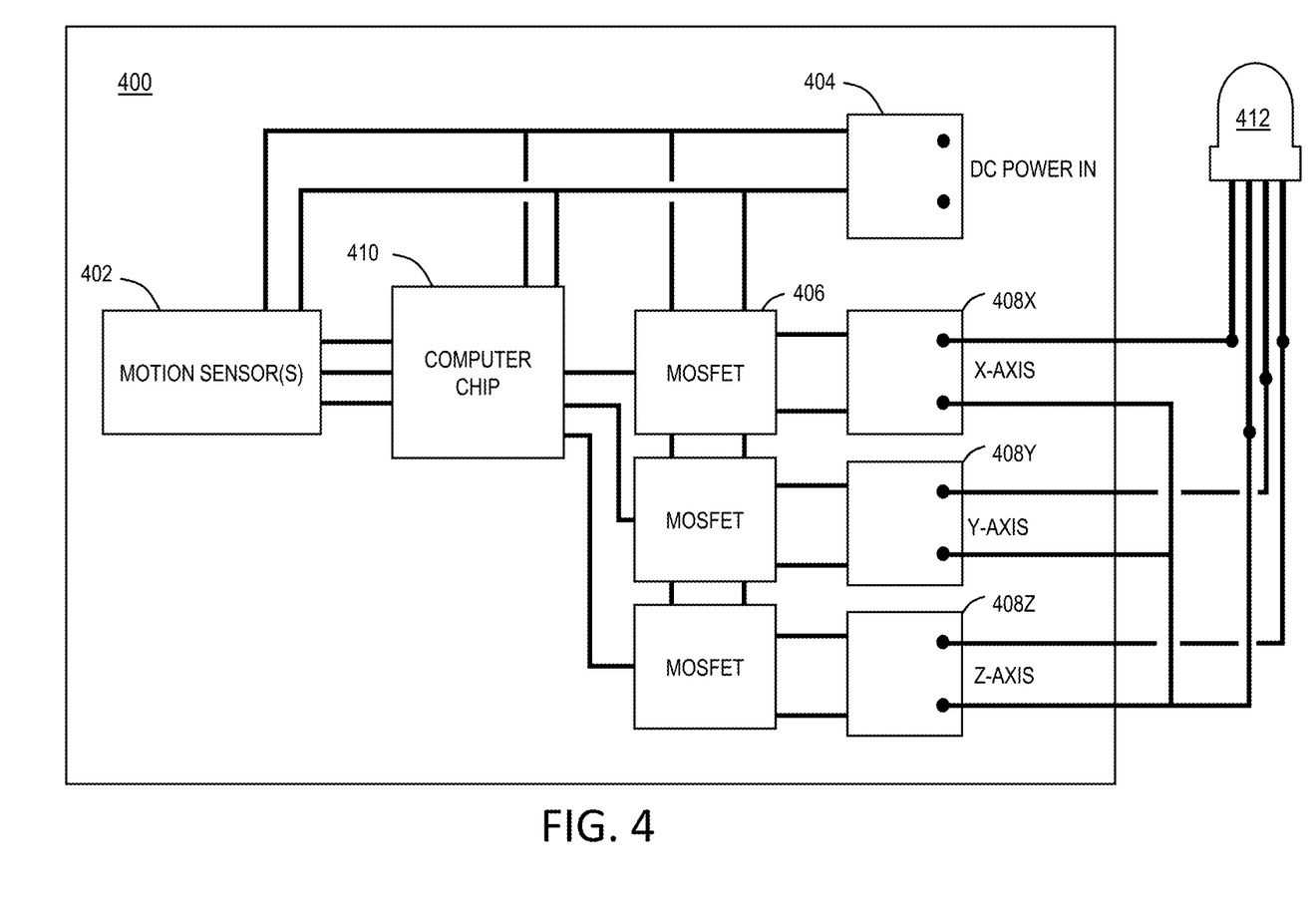
FIG. 4 is a schematic circuit diagram of the lighting controller of FIG. 3, coupled to a single RGB-style LED.

FIG. 4 depicts a third illustrative version of system 14, in the form of a system 400. System 400 includes a sensor suite 402 having a three-axis accelerometer. DC power 404 is depicted coming in at the upper right corner from a power supply (not shown). This DC power supplies all of the devices, and offers load current to three MOSFETs 406, which are configured to vary the output voltage to three corresponding DC output terminal blocks (408X, 408Y, and 408Z) based on a control input from the computer chip/microcontroller 410. This arrangement is similar to system 300. However, an RGB-type LED lamp 412 is wired such that each of the DC output terminal blocks is coupled to a respective one of the color inputs of the LED. This facilitates turning the magnitude of each color (red, green, or blue) up or down independently in response to the gain of a corresponding axis of acceleration or rotation. The overall combination of colors within the lamp results in a wide variety of color outcomes, depending (for example) on orientation of the overall device. This effect allows the user to move and/or orient in a particular direction (X, Y, or Z) to create a specific color, or in random ways to create a variable color on demand.

In some examples, gain, color, or brightness information is communicated digitally via a communication bus, e.g., such that the controller can address each LED individually. In this configuration, no MOSFETs are needed, as the controller communicates with a separate controller on each LED lamp, which then displays in accordance with the instructions. Communication may also be synchronized wirelessly to other devices, such as an illuminated yoga mat or floor mounted dome lights with their own transceivers and light-emitting technology.

Figure 5:
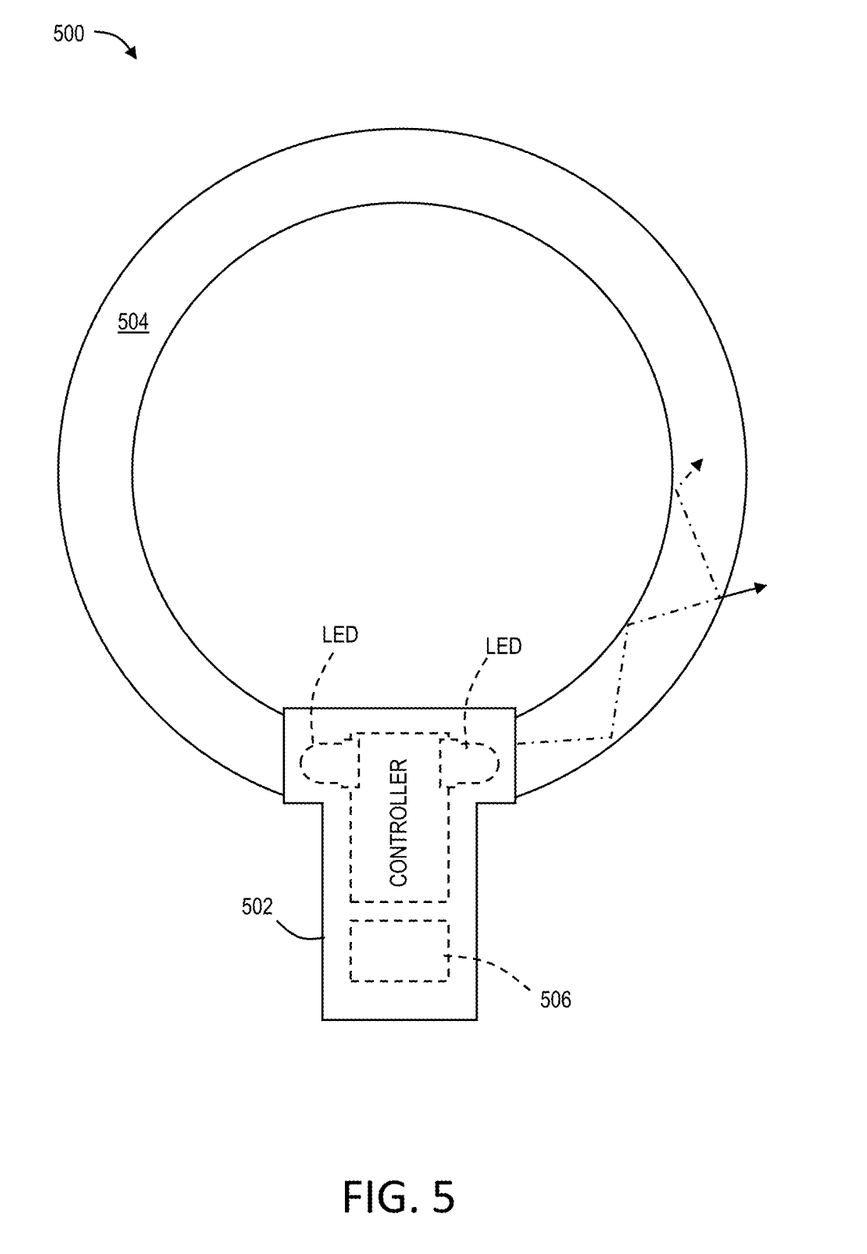
FIG. 5 is a schematic diagram of an illustrative device having a light-conducting optical tube in accordance with aspects of the present disclosure.

FIG. 5 illustrates a novel light pipe or flexible light transmitting apparatus similar to a fiber optic device. Typically, fiber optics are used to transmit light over distances by containing the light inside a transparent glass or polymer rod, relying on the reflective inner surface of the boundary between the transparent medium and the outside air. Fiber optics used in displays or decorative art use a fiber which allows some light to leak out the side. This is done by providing a frosted surface which scatters the light, rather than reflecting all of the light back into the transparent medium.

In the device of FIG. 5, the challenge being addressed is to provide a single continuous side light emitting fiber which is large enough to carry a substantial amount of light.

In some examples, a flexible plastic tube is filled with a clear liquid (such as mineral oil). A conventional LED bulb or any other type of light emitting device is inserted into one or both ends of the tube to contain the fluid. A seal is then formed to retain the fluid. By locating the bulb in direct contact with the fluid, a high degree of light transmission is achieved as compared with examples that have an air gap between the end of a fiber and the bulb.

Because the light pipe tube in this example is not solid plastic, a smaller bend radius is possible for artistic purposes. The fluid inside the tube acts as a conduit for the light with the same effect of creating a reflective or semi-reflective boundary layer between the fluid and the inside of the tube, allowing the light to bounce off or leak out. In some examples, the fluid also contains small glitter-like particles or beads of plastic which offer unique light scattering effects.

In some examples, a fiber optic light pipe or other flexible light-transmitting apparatus is utilized. Fiber optics used in displays or decorative art use a fiber which allows some light to leak out the side. This is done by providing a frosted surface which scatters the light, rather than reflecting all the light back into the transparent medium. The present disclosure addresses the challenge of providing a single continuous side-light-emitting fiber which is bright enough to be seen in daylight. In some examples, this is accomplished by incorporating several high-powered LED surface mount bulbs arrayed on a printed circuit board (PCB), such that the LED lamps shine in at least one end (preferably both ends) of the fiber optic loop.

Wearable device 500 in FIG. 5 includes a housing 502 and a fiber optic ring or loop 504. A power source 506 is provided. Housing 502 may include a securing element configured to removably couple the device to the user. The housing of the wearable device 500 facilitates removal of the fiber-optic ring, such that other light-pipe like attachments may be secured to the light socket. These other attachments may include a bundle of individual fiber optic filaments (e.g., up to 10 feet in length) or transparent artificial horns or antlers configured to light up, or any other suitable transparent or translucent ornamentation. In some examples, the light pipe is straight or differently curved, for example to form an umbrella handle or cane, or a portion thereof. In some examples, illuminated structures include an umbrella with its canopy illuminated from underneath, where the light source changes color as the umbrella is maneuvered and swung around in three-dimensional space.

B. Illustrative Wristband Having a Motion-Tracking Light Control System

Although the color-changing and/or brightness-control lighting technology of the present disclosure can be applied to any wearable, motion-activated lighting apparatus, a particular embodiment will now be described. Specifically, FIGS. 6-11 depict an illustrative lighted wristband 600 configured to be worn on the wrist of a user.

Wristband 600 resembles a wristwatch in the sense that it has flexible straps 602 and 604 connected to a central housing 606, where the straps are configured to be wrapped around a user's wrist and secured to each other, e.g., using a buckle. Central housing 606 has four main parts: an upper case 608, a lower case 610, a circuit board 612 having an RGB LED array 614, and a battery 616. Upper case 608 includes a visible light-transparent or -translucent cover 618 disposed over circuit board 612. Cover 618 allows light from the mounted LED lights to radiate outward and be visible to the user and nearby viewers. Lower case 610 forms the second half of a set of slots which the straps slide into, holds a set of magnets 620 used to attach the center housing to a charging port. A charge connection port 622 has a set of pogo pins and small magnets. The lower case forms a waterproof seal for the entire case. The circuit board supports an accelerometer 624 configured to tracks three-dimensional motion and orientation, and to communicate that data to a microprocessor 626. Microprocessor 626 is configured to change the brightness of LED array 614.

Figure 11:
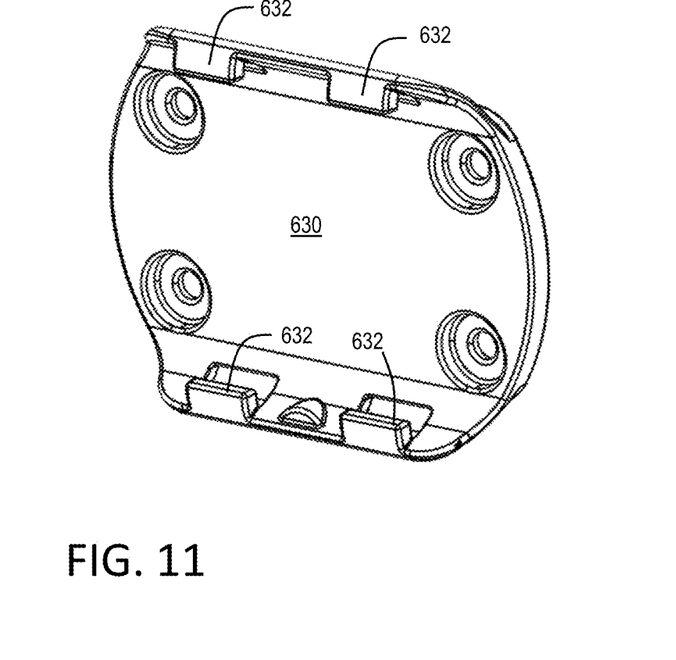
FIG. 11 is an isometric view of an illustrative docking and charging station suitable for use with the wristband of FIG. 6.

Slots or channels 628 at ends of housing 606 are configured to removably receive straps 602, 604. When the straps are removed (e.g., slid out of the channels), channels 628 may be utilized to secure the housing to a docking cradle 630. Docking cradle 630, an example of which is depicted in FIG. 11, may include a set of retainer tabs 632 for this purpose. Cradle 630 can be mounted to any suitable surface, such as a wall, or to portable or wearable objects, such as backpacks or dog harnesses.

Figure 10:
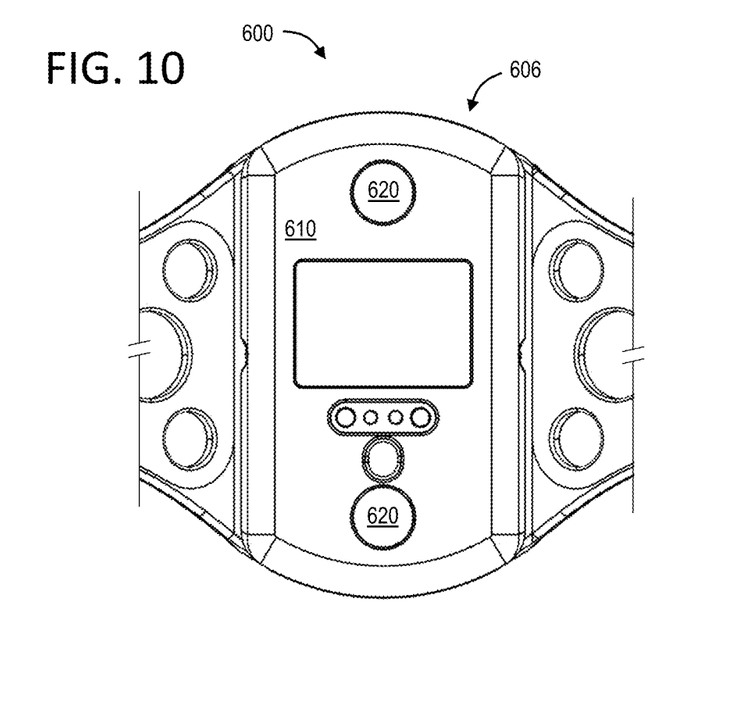
FIG. 10 is a partial bottom view of the wristband of FIG. 6, showing various illustrative control features.

In some examples, housing 606 includes a standard charging interface on a bottom surface (see FIG. 10). This allows the device to be easily attached to a charging station. Any suitable (e.g., USB) charging port connection may be utilized. This feature allows the wristband to be used in commercial or classroom settings where several people use several of the wristbands and return them, e.g., to a wall-mounted charger after use.

Figure 6:
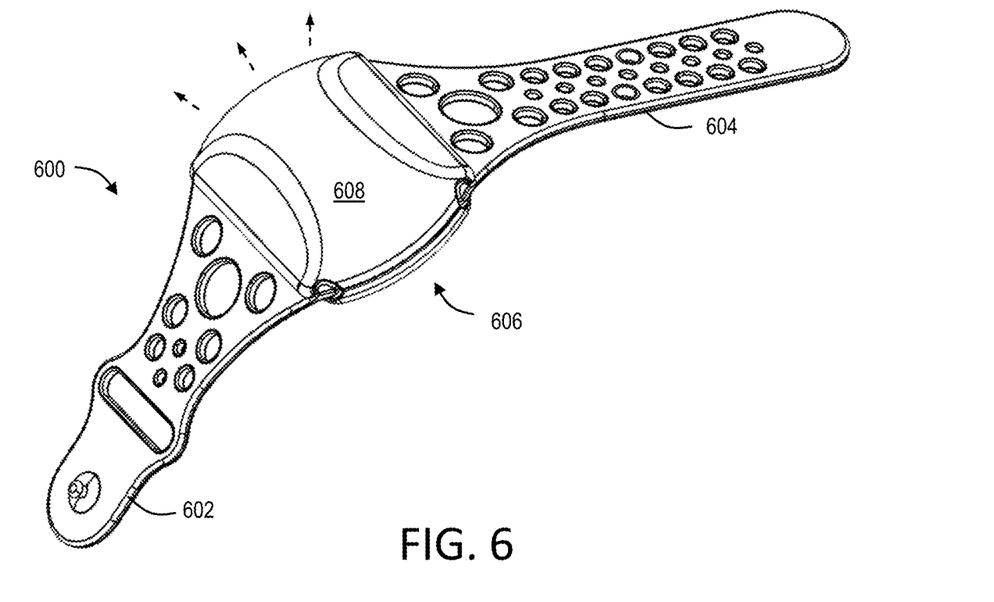
FIG. 6 is an isometric view of an illustrative wristband in accordance with aspects of the present disclosure.
Figure 7:
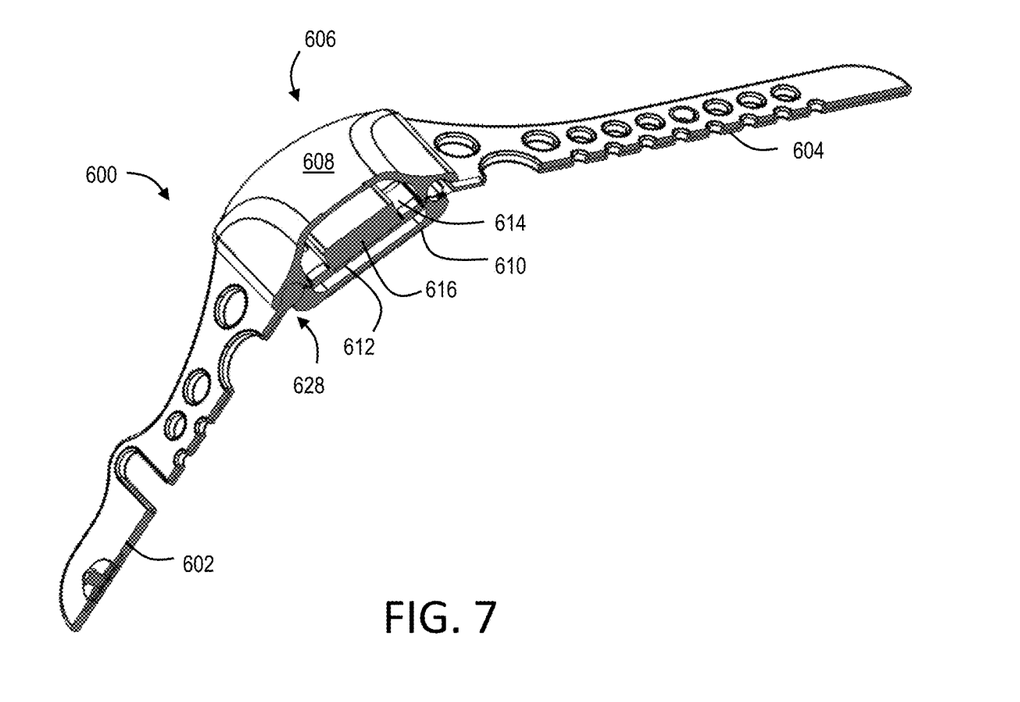
FIG. 7 is a sectional view of the wristband of FIG. 6, taken along a centerline of the device.
Figure 8:
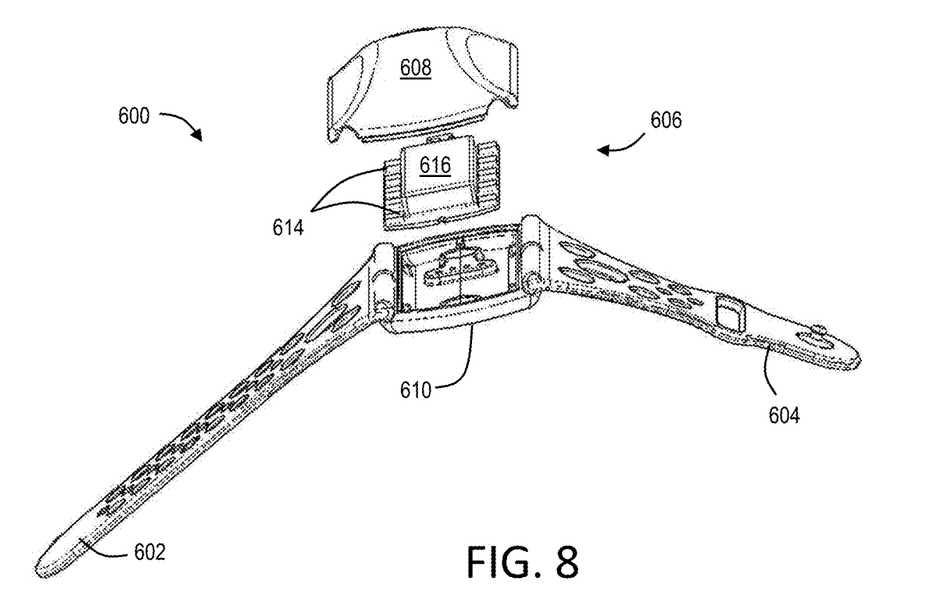
FIG. 8 is an exploded view of the wristband of FIG. 6.
Figure 9:
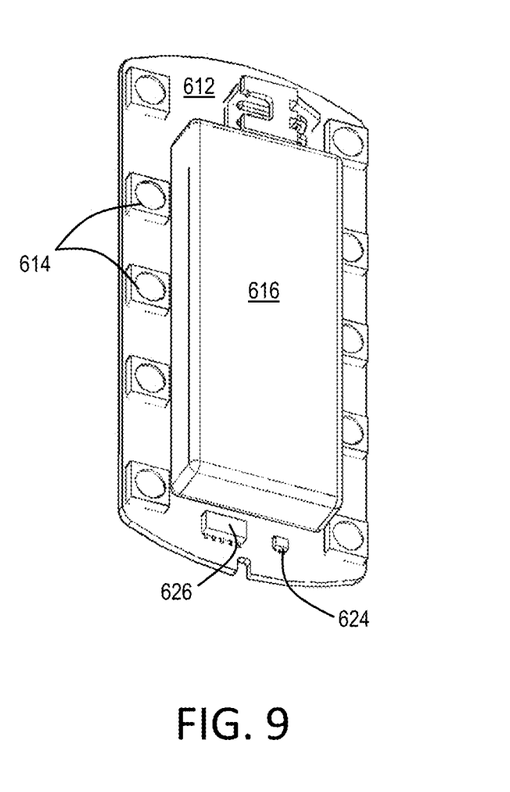
FIG. 9 is an isometric view of an internal portion of the wristband of FIG. 6.

In some examples, wristband 600 is waterproof. To facilitate this feature, charging connections include a magnet, pogo-pin style connector(s), and few or no user interface buttons. Without an on/off switch or a function button, information from the onboard accelerometer can be used to wake up the device, put the device into a sleep mode, etc.

Any suitable lighting scheme may be utilized and programmed into microcontroller 626. In some examples, the control system is configured to respond to a tilt angle in a 90-degree range to change the brightness of one of the three LED colors from 100% on to 100% off. For example, if a positive Z axis is defined as pointing up, and that axis is associated with the red color, red will be on 100% and the green and blue colors will be off when the device is oriented in a straight up direction. If the wristband is rolled 90 degrees toward the X axis (associated in this example with the blue color), blue will be on 100% and red will be off. If the wristband is rolled another 90 degrees, again aligning with the Z axis, the color would return to red. If the wristband is rolled only 45 degrees toward blue, both red and blue will be on at 50%, thereby producing the color purple. Similar results occur if the wristband is oriented along the Y axis, associated with green. This configuration allows the generation of a wide palette of colors depending on how the wristband is rolled and pitched in three-dimensional space.

C. Illustrative Combinations and Additional Examples

This section describes additional aspects and features of wearable devices having motion-based lighting controllers, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A wearable or portable device, comprising:
an accelerometer configured to sense an orientation of the wearable or portable device when worn or carried;
a plurality of light emitting diode (LED) lamps disposed on the wearable or portable device; and
processing logic configured to receive orientation information from the accelerometer and to control the plurality of LED lamps based on the orientation information.

A1. The wearable or portable device of paragraph A0, wherein the accelerometer is a multi-axis accelerometer.

A2. The wearable or portable device of paragraph A1, wherein the orientation information includes a first orientation with respect to a first axis, a second orientation with respect to a second axis, and a third orientation with respect to a third axis.

A3. The wearable or portable device of paragraph A2, wherein the plurality of LED lamps comprise red-green-blue (RGB) LED lamps, each having a red LED, a green LED, and a blue LED in a same respective lamp package.

A4. The wearable or portable device of paragraph A3, wherein the processing logic is configured to:
control a brightness of the red LED of the RGB LED lamps based on the first orientation,
control a brightness of the green LED of the RGB LED lamps based on the second orientation, and
control a brightness of the blue LED of the RGB LED lamps based on the third orientation.

A5. The wearable or portable device of paragraph A2, wherein the plurality of LED lamps comprise single-color LED lamps.

A6. The wearable or portable device of paragraph A5, wherein a brightness of at least a first one of the single-color LED lamps is controlled based on the first orientation, a brightness of at least a second one of the single-color LED lamps is controlled based on the second orientation, and a brightness of at least a third one of the single-color LED lamps is controlled based on the third orientation.

A7. The wearable or portable device of any one of paragraphs A0 through A6, further comprising a rechargeable battery configured to power the processing logic and the plurality of LED lamps.

A8. The wearable or portable device of any one of paragraphs A0 through A7, wherein the wearable or portable device comprises a wristband, such that the orientation of the wearable or portable device is configured to correspond to an orientation of a forearm of a user.

A9. The wearable or portable device of any one of paragraphs A0 through A8, wherein controlling the plurality of LED lamps includes controlling a variable analog voltage output to the plurality of LED lamps.

A10. The wearable or portable device of paragraph A9, further comprising one or more MOSFETs configured to vary the analog voltage output based on a signal from the processing logic.

B0. A wearable or portable device, comprising:
a motion sensor configured to sense movement of the wearable or portable device when worn or carried;
a plurality of light emitting diode (LED) lamps disposed on the wearable or portable device; and
processing logic configured to receive information from the motion sensor and to control the plurality of LED lamps based on the received information.

B1. The wearable or portable device of paragraph B0, wherein the motion sensor is a multi-axis accelerometer.

B2. The wearable or portable device of paragraph B1, wherein the received information includes a first orientation with respect to a first axis, a second orientation with respect to a second axis, and a third orientation with respect to a third axis.

B3. The wearable or portable device of paragraph B2, wherein the plurality of LED lamps comprise red-green-blue (RGB) LED lamps, each having a red LED, a green LED, and a blue LED in a same respective lamp package.

B4. The wearable or portable device of paragraph B3, wherein the processing logic is configured to:
control a brightness of the red LED of the RGB LED lamps based on the first orientation,
control a brightness of the green LED of the RGB LED lamps based on the second orientation, and
control a brightness of the blue LED of the RGB LED lamps based on the third orientation.

B5. The wearable or portable device of paragraph B2, wherein the plurality of LED lamps comprise single-color LED lamps.

B6. The wearable or portable device of paragraph B5, wherein a brightness of at least a first one of the single-color LED lamps is controlled based on the first orientation, a brightness of at least a second one of the single-color LED lamps is controlled based on the second orientation, and a brightness of at least a third one of the single-color LED lamps is controlled based on the third orientation.

B7. The wearable or portable device of any one of paragraphs B0 through B6, further comprising a rechargeable battery configured to power the processing logic and the plurality of LED lamps.

B8. The wearable or portable device of any one of paragraphs B0 through B7, wherein the motion sensor comprises a gyroscope, and the received information comprises a rate of angular rotation.

B9. The wearable or portable device of any one of paragraphs B0 through B8, wherein the wearable or portable device comprises a wristband and the motion sensor comprises a multi-axis accelerometer, such that the received information includes an orientation of the wristband.

B10. The wearable or portable device of any one of paragraphs B0 through B9, wherein controlling the plurality of LED lamps includes controlling a variable analog voltage output to the plurality of LED lamps.

B11. The wearable or portable device of paragraph B10, further comprising one or more MOSFETs configured to vary the analog voltage output based on a signal from the processing logic.

C0. A motion-tracking light control system, comprising:
a motion sensor;
processing logic configured to translate the motion sensor output rate into a set gain value; and
an amplifier configured to convert the gain value into an analog variable voltage output; and
one or more LEDs configured to receive the analog variable voltage output.

C1. The system of C0, wherein the motion sensor includes an accelerometer.

C2. The system of C0 or C1, wherein the motion sensor includes a gyroscope.

C3. The system of any one of paragraphs C0 through C2, wherein the amplifier comprises a semiconductor (e.g., MOSFET).

C4. The system of any one of paragraphs C0 through C3 including both an accelerometer and a gyroscope, wherein outputs of the accelerometer and the gyroscope are combined to generate gain profiles not possible using only one type of sensor.

C5. The system of any one of paragraphs C0 through C4, wherein the processing logic is further configured to sense multiple axes of motion (e.g., X, Y and Z) and driving three different variable voltage outputs, each having their own (unique or identical) software gain curve.

C6. The system of C5, where the three outputs are connected to at least one common RGB light source capable of producing a variety of colors.

C7. The system of any one of paragraphs C0 through C6, wherein the system controls the brightness of lights on or of an object (e.g., toys and accessories, shoes, beach balls with lights inside, lighting-enabled hats and handheld sports fan accessories at sporting events, flashlights, bike lights, thrown objects, and/or illuminated costumes).

D0. A light emitter using the system of any one of paragraphs C0 through C6, wherein the sensor controls a light pipe coupled to at least one light source.

D1. The light emitter of D0, wherein the light pipe comprises one or two light sources inserted into respective ends of a plastic tube filled with a clear fluid, wherein the fluid transmits light within the fluid and light is configured to leak out of a periphery of the tube.

D2. The light emitter of D1, wherein the fluid comprises glitter particles configured to scatter light.

D3. The light emitter of D0, wherein the light pipe comprises a bundle of small fiber-optic filaments.

D4. The light emitter of D0, wherein the light pipe comprises an annular fiber optic rod or tube.

D5. The light emitter of D0, wherein the light pipe comprises one or more of a variety of stylized clear or translucent objects, such as horns, antlers, and/or other accessories.

Although the present disclosure, including paragraphs A0 through D5, may refer at times to accelerometers and gyroscopes, other motion sensing devices may be utilized in addition to these devices and/or instead of these devices. For example, suitable motion sensors may include magnetometers, six-axis inertial measurement units (IMUs), and nine-axis absolute orientation sensors (i.e., a packaged accelerometer/gyroscope/magnetometer).

D. Illustrative Method

Figure 12:
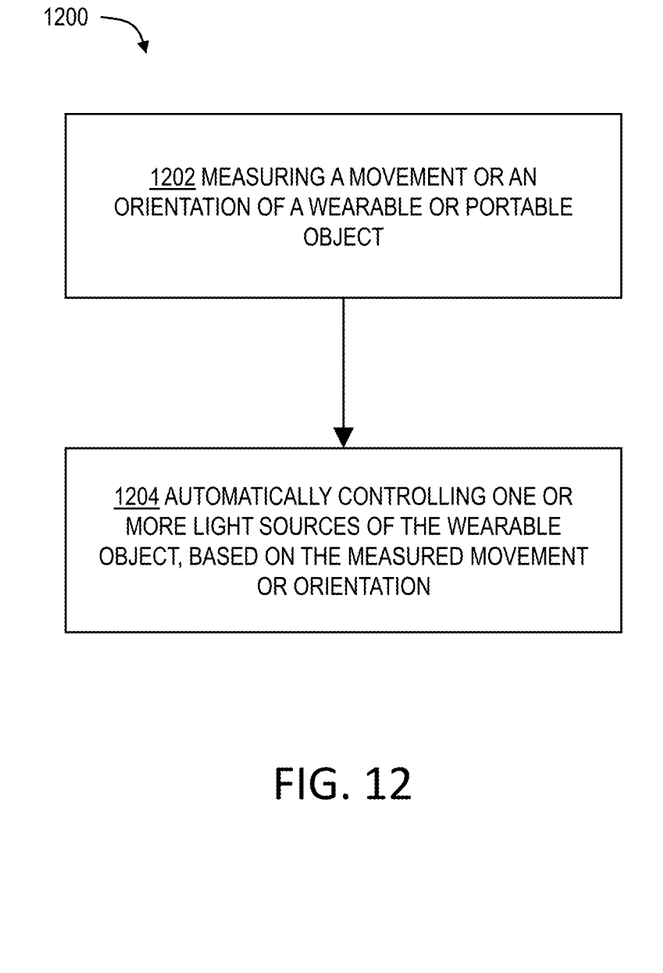
FIG. 12 is a flow chart depicting steps of an illustrative method for controlling light sources on a wearable or portable object.

This section describes steps of an illustrative method 1200 for controlling lights of a wearable or portable object; see FIG. 12. Aspects of the devices described above may be utilized in the method steps described below. Where appropriate, reference may be made to components and systems that may be used in carrying out each step. These references are for illustration, and are not intended to limit the possible ways of carrying out any particular step of the method.

FIG. 12 is a flowchart illustrating steps performed in an illustrative method, and may not recite the complete process or all steps of the method. Although various steps of method 1200 are described below and depicted in FIG. 12, the steps need not necessarily all be performed, and in some cases may be performed simultaneously or in a different order than the order shown.

Step 1202 of method 1200 includes measuring a movement or an orientation of a wearable object (e.g., a costume accessory, wristband, or headdress) using a motion sensor.

Step 1204 of method 1200 includes automatically controlling one or a plurality of light sources (e.g., light emitting diode (LED) lamps) of (e.g., disposed on or in) the wearable object, based on the measured movement or orientation. In some examples, the light sources are LED lamps, and controlling the LED lamps includes changing a respective brightness of each of the LED lamps in response to a movement and/or a change in the orientation of the wearable object (e.g., relative to XYZ axes).

For example, three different outputs may be provided in this step, each output associated with movement or orientation relative to one of the three axes (i.e., X, Y, or Z). In some examples, each of the plurality of LED lamps is a red-green-blue (RGB) LED lamp, and controlling the plurality of LED lamps comprises changing a color of the RGB LED lamps in response to a change in the orientation of the wearable object. For example, red LEDs of each RGB LED lamp may be controlled based on the X-axis output, green LEDs of each RGB LED lamp may be controlled based on the Y-axis output, and blue LEDs of each RGB LED lamp may be controlled based on the Z-axis output. However, any color may be associated with any axis, as desired. In some cases, the association of a color with an axis may be a user-controlled device setting.

Further method steps and optional features are outlined in the alphanumerically designated paragraphs below.

E0. A method for lighting a wearable object, the method comprising:
measuring an orientation of a wearable object using a motion sensor; and automatically controlling a plurality of light emitting diode (LED) lamps disposed on the wearable object, based on the measured orientation.

E1. The method of EU, wherein controlling the plurality of LED lamps comprises changing a respective brightness of each of the LED lamps in response to a change in the orientation of the wearable object.

E2. The method of EU, wherein each of the plurality of LED lamps is a red-green-blue (RGB) LED lamp, and controlling the plurality of LED lamps comprises changing a color of the RGB LED lamps in response to a change in the orientation of the wearable object.

E3. The method of EU, wherein the wearable object comprises a wristband.

E4. The method of EU, wherein the motion sensor comprises a three-axis accelerometer.

E5. The method of E4, wherein the measured orientation includes respective information regarding each of the three axes.

E6. The method of EU, further comprising:
measuring a rate of rotation of the wearable object using a gyroscope; and
changing a state of the LED lamps based on the measured rate of rotation.

Advantages, Features, and Benefits

The different embodiments and examples of devices having motion-based lighting control systems described herein provide several advantages over known solutions. For example, illustrative embodiments and examples described herein allow a wearable object to be self-contained, such that the device does not need to be tethered to an external power source or controller.

Additionally, and among other benefits, illustrative embodiments and examples described herein allow a wearable or portable object to complement the user's motion or performance automatically. For example, a yoga practitioner (or class) may enjoy the color-changing aspects of wristbands, as they offer visual feedback on proper body position. Because the colors turn the fullest primary color saturation at the center of each axis, a student can watch for this saturation to know when their arm, for example, is at a horizontal or other desired position.

Additionally, and among other benefits, illustrative embodiments and examples described herein all operate under the same force of gravity, such that when several users move in unison, the lighting on the several users also changes in unison.

Additionally, and among other benefits, illustrative embodiments and examples described herein respond automatically to user motion in real time. This real-time visualization can extend and project the non-verbal communication between performers.

Additionally, and among other benefits, illustrative embodiments and examples described herein allow movement of the same object that has the lights to control the lights. In other words, the controller of the device is the device itself.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A wearable device, comprising:
a motion sensor configured to sense motion of the wearable device when worn, wherein the motion sensor is a multi-axis accelerometer;
a plurality of light emitting diode (LED) lamps disposed on the wearable device, wherein the plurality of LED lamps comprise red-green-blue (RGB) LED lamps, each having a red LED, a green LED, and a blue LED in a same respective lamp package; and
processing logic configured to receive information from the motion sensor and to control the plurality of LED lamps based on the received information, wherein the received information includes a first orientation with respect to a first axis, a second orientation with respect to a second axis, and a third orientation with respect to a third axis; and
wherein the processing logic is configured to:
control a brightness of the red LED of the RGB LED lamps based on the first orientation,
control a brightness of the green LED of the RGB LED lamps based on the second orientation, and
control a brightness of the blue LED of the RGB LED lamps based on the third orientation.

2. The wearable device of claim 1, wherein the motion sensor comprises a gyroscope, and the received information comprises a rate of angular rotation.

3. The wearable device of claim 1, wherein the wearable device comprises a wristband and the motion sensor comprises a multi-axis accelerometer, such that the received information includes an orientation of the wristband.

4. The wearable device of claim 1, wherein controlling the plurality of LED lamps includes controlling a variable analog voltage output to the plurality of LED lamps.

5. A wearable device, comprising:
an accelerometer configured to sense an orientation of the wearable device when worn;
a plurality of light emitting diode (LED) lamps disposed on the wearable device; and
processing logic configured to receive orientation information from the accelerometer and to control the plurality of LED lamps based on the orientation information;
wherein controlling the plurality of LED lamps includes controlling a variable analog voltage output to the plurality of LED lamps.

6. The wearable device of claim 5, wherein the accelerometer is a multi-axis accelerometer.

7. The wearable device of claim 6, wherein the orientation information includes a first orientation with respect to a first axis, a second orientation with respect to a second axis, and a third orientation with respect to a third axis.

8. The wearable device of claim 7, wherein the plurality of LED lamps comprise red-green-blue (RGB) LED lamps, each having a red LED, a green LED, and a blue LED in a same respective lamp package.

9. The wearable device of claim 8, wherein the processing logic is configured to:
control a brightness of the red LED of the RGB LED lamps based on the first orientation,
control a brightness of the green LED of the RGB LED lamps based on the second orientation, and
control a brightness of the blue LED of the RGB LED lamps based on the third orientation.

10. The wearable device of claim 7, wherein the plurality of LED lamps comprise single-color LED lamps.

11. The wearable device of claim 10, wherein a brightness of at least a first one of the single-color LED lamps is controlled based on the first orientation, a brightness of at least a second one of the single-color LED lamps is controlled based on the second orientation, and a brightness of at least a third one of the single-color LED lamps is controlled based on the third orientation.

12. The wearable device of claim 5, further comprising a rechargeable battery configured to power the processing logic and the plurality of LED lamps.

13. The wearable device of claim 5, wherein the wearable device comprises a wristband, such that the orientation of the wearable device is configured to correspond to an orientation of a forearm of a user.

14. A wearable device, comprising:
a motion sensor comprising a multi-axis accelerometer and configured to sense motion of the wearable device when worn;
a plurality of light emitting diode (LED) lamps disposed on the wearable device, wherein the plurality of LED lamps comprise single-color LED lamps; and
processing logic configured to receive information from the motion sensor and to control the plurality of LED lamps based on the received information, wherein the received information includes a first orientation with respect to a first axis, a second orientation with respect to a second axis, and a third orientation with respect to a third axis;
wherein a brightness of at least a first one of the single-color LED lamps is controlled based on the first orientation, a brightness of at least a second one of the single-color LED lamps is controlled based on the second orientation, and a brightness of at least a third one of the single-color LED lamps is controlled based on the third orientation.

15. The wearable device of claim 14, wherein the motion sensor comprises a gyroscope, and the received information comprises a rate of angular rotation.

16. The device of claim 14, wherein the wearable device comprises a wristband and the motion sensor comprises a multi-axis accelerometer, such that the received information includes an orientation of the wristband.

17. The wearable device of claim 14, wherein controlling the plurality of LED lamps includes controlling a variable analog voltage output to the plurality of LED lamps.

* * * * *